(12) United States Patent
Kim

(10) Patent No.: US 12,691,865 B2
(45) Date of Patent: Jul. 28, 2026

(54) HYBRID ELECTRIC VEHICLE AND A METHOD OF CONTROLLING DRIVING OF A MOTOR THEREFOR

(71) Applicants: HYUNDAI MOTOR COMPANY, Seoul (KR); KIA CORPORATION, Seoul (KR)

(72) Inventor: Min Su Kim, Hwaseong-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 415 days.

(21) Appl. No.: 17/943,279

(22) Filed: Sep. 13, 2022

(65) Prior Publication Data

US 2023/0339453 A1 Oct. 26, 2023

(30) Foreign Application Priority Data

Apr. 22, 2022 (KR) ........................ 10-2022-0049947

(51) Int. Cl.
B60W 20/15 (2016.01)
B60K 6/442 (2007.10)
(Continued)

(52) U.S. Cl.
CPC ............. B60W 20/15 (2016.01); B60K 6/442 (2013.01); B60W 10/08 (2013.01); H02P 25/18 (2013.01);
(Continued)

(58) Field of Classification Search
CPC .......... B60K 6/20; B60K 6/387; B60K 6/442; B60K 6/46; B60K 6/48; B60W 10/08;
(Continued)

(56) References Cited

U.S. PATENT DOCUMENTS 6,570,778 B2 * 5/2003 Lipo ........................ H02P 1/44
318/807
10,651,772 B2 5/2020 Kim et al.
(Continued)

FOREIGN PATENT DOCUMENTS

KR 20190119780 A 10/2019
KR 20200065685 * 1/2020 ............. B60L 15/20
(Continued)

*Primary Examiner* — Christian Chace
*Assistant Examiner* — Nicholas Stryker
(74) *Attorney, Agent, or Firm* — Lempa Summerfied Katz LLC

(57) ABSTRACT

Proposed is a method of controlling motor driving of a hybrid electric vehicle. Sum torque of a first motor, which is directly connected to an engine, and a second motor, which is directly connected to an input end of a transmission, are determined based on request torque and torque distributed to the engine. One of a first synthetic efficiency map and a second synthetic efficiency map, to which different conversion references of the motor drive mode are set, are selectively applied to an efficiency map of the second motor, based on information about the motor drive mode applied to the second motor. The sum torque is distributed to each of the first motor and the second motor based on an efficiency map of the first motor and the efficiency map of the second motor.

16 Claims, 10 Drawing Sheets

(51) Int. Cl.

| | | |
|---|---|---|
| *B60W 10/08* | (2006.01) | |
| *B60W 50/00* | (2006.01) | |
| *H02P 25/18* | (2006.01) | |
| *H02P 25/22* | (2006.01) | |

(52) U.S. Cl.
CPC ..... *H02P 25/22* (2013.01); *B60W 2050/0026* (2013.01); *B60W 2510/0657* (2013.01); *B60W 2510/083* (2013.01); *B60W 2710/086* (2013.01)

(58) Field of Classification Search
CPC ...... B60W 20/10; B60W 20/11; B60W 20/15; B60W 30/188; B60W 20/20; B60W 2050/0026; B60W 2510/0657; B60W 2510/083; B60W 2710/0666; B60W 2710/083; G05D 1/0061; G05D 1/0088; G05D 1/021; G05D 1/0214; G05D 1/0221; G05D 1/0223; H02K 21/46; H02K 17/26; H02K 19/14

See application file for complete search history.

(56) References Cited

U.S. PATENT DOCUMENTS

| | | | |
|---|---|---|---|
| 10,778,114 | B2 | 9/2020 | Lu et al. |
| 11,097,624 | B2 | 8/2021 | Kobayashi |
| 11,159,096 | B2 | 10/2021 | Yuyama |
| 2007/0241699 | A1* | 10/2007 | Osada ........................ H02P 5/74 |
| | | | 318/141 |
| 2010/0253139 | A1* | 10/2010 | King ........................ B60L 1/006 |
| | | | 307/9.1 |
| 2013/0030638 | A1* | 1/2013 | Nissato ............... B60W 50/082 |
| | | | 180/65.23 |
| 2014/0088807 | A1* | 3/2014 | Saito ................. B60W 30/1882 |
| | | | 180/65.265 |
| 2016/0059711 | A1 | 3/2016 | Holmes et al. |
| 2017/0166200 | A1* | 6/2017 | Miyagawa ............ B60W 20/20 |
| 2019/0123665 | A1 | 4/2019 | Apelsmeier et al. |
| 2019/0275999 | A1* | 9/2019 | Ohn ........................ B60W 20/15 |
| 2019/0319571 | A1 | 10/2019 | Kim et al. |
| 2020/0307392 | A1* | 10/2020 | Joseph ................... B60L 50/16 |
| 2020/0389115 | A1 | 12/2020 | Saha et al. |
| 2021/0031634 | A1* | 2/2021 | Erbey ................ G01C 21/3453 |
| 2021/0170883 | A1* | 6/2021 | Hu ............................ B60K 1/02 |
| 2021/0384863 | A1* | 12/2021 | Omata .................... H02P 25/22 |
| 2022/0242398 | A1* | 8/2022 | Tagami .................... B60K 6/20 |
| 2023/0283207 | A1 | 9/2023 | Jung et al. |
| 2023/0365122 | A1* | 11/2023 | Suyama ................. B60K 6/365 |

FOREIGN PATENT DOCUMENTS

| | | | | |
|---|---|---|---|---|
| KR | 20210148613 | * | 12/2021 | ............. B60L 15/20 |
| KR | 20230132028 | A | 9/2023 | |

* cited by examiner

Efficiency Map for Second Motor
to Which CEW is Applied

Torque

RPM

High Efficiency Region

Efficiency Map for Second Motor
to Which OEW is Applied

Second Synthetic Efficiency Map

HYBRID ELECTRIC VEHICLE AND A METHOD OF CONTROLLING DRIVING OF A MOTOR THEREFOR

CROSS-REFERENCE TO RELATED APPLICATION

The present application claims priority to Korean Patent Application No. 10-2022-0049947, filed Apr. 22, 2022, the entire contents of which are incorporated herein by reference.

BACKGROUND

1. Technical Field

The present disclosure relates generally to a hybrid electric vehicle and a method of controlling driving of a motor therefor, and more particularly to a hybrid electric vehicle and a method of controlling driving of a motor therefor capable of improving electric energy efficiency.

2. Related Art

With the recent worldwide trend of reducing carbon dioxide emissions, instead of typical internal combustion engine vehicles that generate driving power through combustion of fossil fuel, electrified vehicles, which drive a motor with electric energy stored in an energy storage device such as a battery and generate driving power, are becoming more popular.

As one example of an electrified vehicle, a hybrid electric vehicle (HEV) generally makes use of two power sources together, mainly an engine and an electric motor.

This HEV may be operated in two driving modes according to which power train is driven. One of the modes is an electric vehicle (EV) mode in which the vehicle is driven only by an electric motor, and the other is a hybrid electric vehicle (HEV) mode in which the vehicle operates the engine together with an electric motor to obtain power. HEV performs switching between the two modes according to conditions during driving.

Generally, a winding of each phase included in the electric motor driving the HEV forms a Y connection in which one end thereof is connected to one inverter and the other ends thereof are connected to each other. When the electric motor is driven, a switch inside the inverter is being turned on/off by pulse width modulation control, a line-to-line voltage is applied to windings of the Y-connected motor, which generates an alternating current, thereby generating torque.

Electric energy efficiency of the electrified vehicle that uses torque generated by an electric motor as power is determined by power conversion efficiency between an inverter and a motor. Thus, to improve the electric energy efficiency, it is important to maximize power conversion efficiency of the inverter and efficiency of the motor.

Efficiency of the inverter-motor system is mainly determined by a voltage utility factor. In the case where an operating point of a vehicle is formed which is determined by relation between a motor speed and torque in a section where the voltage utility factor is high, the electric energy efficiency of the vehicle can be improved.

However, as the number of windings of the motor is increased to increase a maximum torque of the motor, a section having a high voltage utility factor becomes distant from a low torque region that is a main operating point of the vehicle, so that a problem that the electric energy efficiency becomes bad may occur.

Further, when a design is performed so as to include the main operating point in the section having the high voltage utility factor in viewpoint of the electric energy efficiency, there is a restriction on the maximum torque of the motor, which may cause a problem in that acceleration power generation performance is deteriorated.

The foregoing is intended merely to aid in the understanding of the background of the present disclosure, and is not intended to mean that the present disclosure falls within the purview of the related art that is already known to those having ordinary skill in the art.

SUMMARY

The present disclosure provides a hybrid electric vehicle (HEV) and a method of controlling driving of a plurality of motors therefor, in which efficiency maps for the plurality of motors, of which driving is controlled according to a motor drive mode, are provided, and requested torque is distributed to the plurality of motors based on applied efficiency maps, and thereby the electric energy efficiency of the HEV is improved.

In one embodiment of the present disclosure, a method of controlling motor driving of a hybrid electric vehicle includes: determining a sum torque of a first motor, which is directly connected to an engine, and a second motor, which is directly connected to an input end of a transmission, based on a requested torque and a torque distributed to the engine; selectively applying, based on information about the motor drive mode applied to the second motor, one of a first synthetic efficiency map and a second synthetic efficiency map, to which different conversion references of the motor drive mode are set, to an efficiency map of the second motor; and distributing the sum torque to each of the first motor and the second motor based on an efficiency map of the first motor and the efficiency map of the second motor.

Further, a hybrid electric vehicle according to an embodiment of the present disclosure includes: an engine; a first motor that is directly connected to the engine; a second motor that is selectively connected with the first motor according to a driving mode; a transmission having an input end directly connected to the second motor; a first control unit that determines a sum torque of the first motor and the second motor based on a requested torque and a torque distributed to the engine, and distributes the sum torque to each of the first motor and the second motor based on an efficiency map of the first motor and an efficiency map of the second motor; and a second control unit that controls driving of the first motor based on the torque distributed to the first motor, determines a motor drive mode based on a torque distributed to the second motor, and controls driving of the second motor according to the determined motor drive mode, wherein the first control unit selectively applies one of a first synthetic efficiency map and a second synthetic efficiency map, to which different conversion references of the motor drive mode are set, to the efficiency map of the second motor, based on information about the motor drive mode received from the second control unit.

The objective of the present disclosure is not limited to the aforementioned description, and other objectives not explicitly disclosed herein will be clearly understood by a person having ordinary skill in the art from the description provided hereinafter.

According to the present disclosure, it is possible to propose a hybrid electric vehicle (HEV) and a method of controlling driving of motors therefor, in which efficiency maps for the motors whose driving is controlled according to a motor drive mode are provided, and requested torques are distributed to the plurality of motors based on the applied efficiency maps, and thereby the electric energy efficiency of the HEV is improved.

The effects that can be obtained from the present disclosure are not limited to the effects mentioned above, and unmentioned other effects may be clearly understood by those having ordinary skill in the art from the following description.

BRIEF DESCRIPTION OF THE DRAWINGS

The above and other objectives, features, and other advantages of the present disclosure will be more clearly understood from the following detailed description when taken in conjunction with the accompanying drawings, in which.

Figure 1:
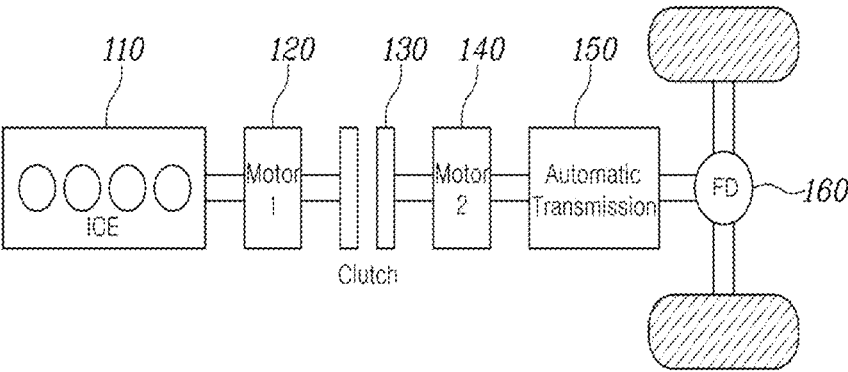
FIG. 1 illustrates an example of a power train configuration for a hybrid electric vehicle (HEV) according to an embodiment of the present disclosure.

The drawings described herein are for illustration purposes only and are not intended to limit the scope of the present disclosure in any way.

DETAILED DESCRIPTION

Hereinafter, embodiments of the present disclosure are described in detail with reference to the accompanying drawings. Throughout the drawings, the same reference numerals will be used to designate the same or like parts, and repeated descriptions of the same or like parts will be omitted. In addition, the terms "module" and "section" used herein are given or mixed in view of easy preparation of the specification only, and do not have meanings or functions distinguished from each other per se. Further, in the following description of the present disclosure, detailed descriptions of well-known functions and components incorporated herein will be omitted when it is determined that the description may make the subject matter in some embodiments of the present disclosure rather unclear. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It should be understood that, although the terms "first", "second", etc., may be used herein to describe various elements, these elements should not be limited by these terms. These terms are only used to distinguish one element from another element.

It should be understood that when an element is referred to as being "coupled", "connected", or "linked" to another element, it may be directly coupled or connected to the other element or intervening elements may be present therebetween. In contrast, it should be understood that when an element is referred to as being "directly coupled", "directly connected", or "directly connected" to another element, there are no intervening elements present. Other expressions that explain the relationship between elements, such as "between", "directly between", "adjacent to", or "directly adjacent to" should be construed in the same manner.

A singular expression may include a plural expression unless not explicitly stated to the contrary.

In the present application, it should be understood that a term "comprise", "include", or "have" indicates that a feature, a number, a step, an operation, a component, a part or the combination thereof described in the specification is present, but does not exclude the possibility of presence or addition of one or more other features, numbers, steps, operations, components, parts or combinations thereof, in advance.

When a component, device, element, or the like of the present disclosure is described as having a purpose or performing an operation, function, or the like, the component, device, or element should be considered herein as being "configured to" meet that purpose or to perform that operation or function.

Further, a unit or a control unit included in a name such as a motor control unit (MCU), a hybrid control unit (HCU), or the like is merely a term that is widely used to give a name to a controller for controlling specified functions of a vehicle, but does not refer to a generic function unit. For example, each controller may include a communication unit that communicates with another controller or a sensor for controlling an undertaking function, a memory that stores an operating system, logic commands, input/output information, and so on, and one or more processors that perform determination, operation, decision, etc. that need to control undertaking functions.

Prior to description of a systematic configuration and a method of controlling driving of a motor for an electrified vehicle according to embodiments of the present disclosure, a structure and a control system for an electrified vehicle in which embodiments of the present disclosure may be utilized will be described.

FIG. 1 illustrates an example of a power train configuration for a hybrid electric vehicle according to an embodiment of the present disclosure.

Referring to FIG. 1, a power train for a hybrid electric vehicle adapts a parallel type hybrid system mounted with two motors 120 and 140 and an engine clutch 130 between an internal combustion engine (ICE) 110 and a transmission 150. This parallel type hybrid system is also called transmission mounted electric drive (TMED) hybrid system because the second motor 140 is always connected to an input end of the transmission 150.

Here, the first motor 120 of the two motors 120 and 140 is disposed between the ICE 110 and a first end of the engine clutch 130, and a shaft of the ICE 110 and a shaft of a first motor of the first motor 120 are directly connected to each other, and may be always rotated together.

One end of a shaft for the second motor 140 may be connected to the other end of the engine clutch 130, and the other end of the shaft for the second motor 140 may be directly connected to an input end of the transmission 150.

The second motor 140 has a greater output than the first motor 120. The second motor 140 may play a role as a driving motor. Further, the first motor 120 performs a function as a starter motor that cranks the ICE 110 when starting the ICE 110. The first motor 120 may collect rotation energy of the ICE 110 through generation of electricity when the ICE 110 is cut, and may generate electricity using power of the ICE 110 while the ICE 110 is driven.

In the hybrid electric vehicle having a power train as illustrated in FIG. 1, when a driver steps on an accelerator after starting (e.g., HEV Ready), the second motor 140 is driven using electric power of a battery (not illustrated) in a condition in which the engine clutch 130 is made open. Accordingly, the power of the second motor 140 moves wheels by way of the transmission 150 and a final drive (FD) 160 (i.e., an EV mode). When a gradually greater driving force is required while the vehicle is gradually accelerated, the first motor 120 may operate to crank the ICE 110.

After the ICE 110 is started, when a difference in revolutions per minute (RPM) between the ICE 110 and the second motor 140 is within a fixed range, the engine clutch 130 is engaged, and the ICE 110 and the second motor 140 are rotated together (i.e., transition from the EV mode to an HEV mode). Accordingly, while going through a torque blending process, output of the second motor 140 is lowered, and output of the ICE 110 is raised, so that requested torque of a driver may be satisfied. In the HEV mode, the ICE 110 may satisfy most of the requested torque. A difference between the engine torque and the requested torque may be compensated through at least one of the first motor 120 and the second motor 140. For example, when the ICE 110 outputs a torque that is higher than the requested torque in consideration of efficiency of the ICE 110, the first motor 120 or the second motor 140 generates electricity from an engine torque surplus. When the engine torque is lower than the requested torque, at least one of the first motor 120 and the second motor 140 may output the deficient torque.

When conditions for engine off, for instance, a condition under which the vehicle is decelerated, are satisfied, the engine clutch 130 becomes open, and the engine 110 is stopped (i.e., transition from the HEV mode to the EV mode). During the deceleration, the battery is charged through the second motor 140 using a driving force of the wheels. This is sometimes referred to as regeneration of brake energy, or regenerative braking.

In embodiments, the transmission 150 may be a steptronic automatic transmission, or a multi-disc clutch transmission, for example, a dual clutch transmission DCT may be used.

Figure 2:
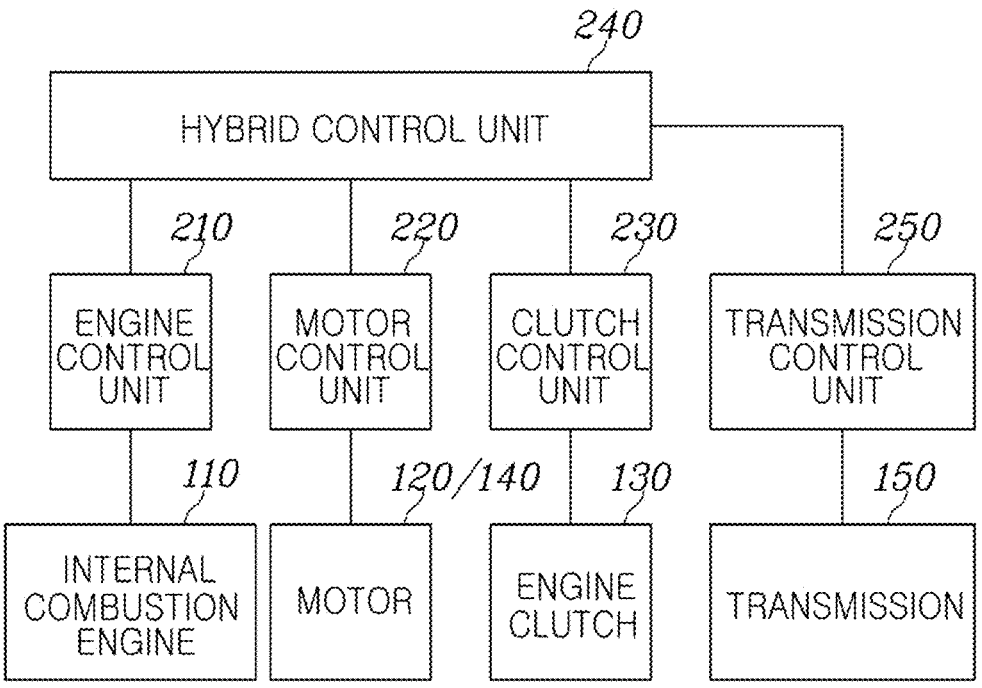
FIG. 2 illustrates an example of a control system configuration for the HEV according to an embodiment of the present disclosure.

FIG. 2 illustrates an example of a control system configuration for the HEV according to an embodiment of the present disclosure.

Referring to FIG. 2, in the HEV in which embodiments of the present disclosure may be utilized, the internal combustion engine 110 may be controlled by an engine control unit 210, and the first motor 120 and the second motor 140 may be controlled by a motor control unit (MCU) 220. The engine clutch 130 may be controlled by a clutch control unit 230. The engine control unit 210 is sometimes also referred to herein as an engine management system (EMS). Further, the transmission 150 may be controlled by a transmission control unit 250.

The MCU 220 may control a gate drive unit (not illustrated) using a control signal. The control signal may be a pulse width modification (PWM) signal generated based on a motor angle, a phase voltage, a phase current, a torque request, etc. of each of the motors 120 and 140. The gate drive unit may control inverters (not illustrated) that drive the motors 120 and 140, respectively.

Each control unit 210, 220, 230, 250 may be connected with a hybrid control unit (HCU) 240 that functions as an upper control unit, and that controls the entire power train including a mode switching process. Under the control of the HCU 240, each control unit 210, 220, 230, 250 may provide the HCU 240 with a driving mode change, information required to control the engine clutch when gear shifting is performed, etc. Additionally or alternatively, information required to control the engine stop may be provided to the HCU 240, or operation based on a control signal may be performed by the HCU 240.

In embodiments, the HCU 240 may determine whether or not to perform switching between the EV and HEV modes or the CD and CS modes (in the case of the PHEV) according to drive condition of the vehicle. To this end, the HCU 240 may determine an open point in time of the engine clutch 130, and may perform hydraulic control when the engine clutch 130 is opened. Further, the HCU 240 may determine states (lock-up, slip, open, etc.) of the engine clutch 130, and may control a point in time of fuel injection stop of the engine 110 based on the states of the engine clutch 130. Further, the HCU 240 may transmit a torque command for controlling torque of the first motor 120 for the purpose of engine stop control, and may control collection of engine rotation energy. Moreover, the HCU 240 may determine states of the drive sources 110, 120, and 140 in order to satisfy the requested torque, and thus may determine request driving forces which may be distributed between the drive sources 110, 120, and 140, and may transmit torque commands to the control units 210 and 220 that control the respective drive sources.

Of course, it is apparent to those skilled in the art that the aforementioned connection relation between the control units and the aforementioned function/division of each control unit are illustrative, and thus names thereof are not restricted. For example, the HCU 240 may be implemented such that the corresponding function is replaced and provided to any one of the control units excluding itself, or the corresponding function is distributed or provided to two or more of the other control units.

The aforementioned configuration of FIGS. 1 and 2 is merely one constitution example of the hybrid electric vehicle, and thus it is apparent to those skilled in the art that the hybrid electric vehicle that may utilize embodiments of the present disclosure is not limited to this structure.

Meanwhile, the hybrid electric vehicle may differently control the drive mode of the second motor 140 depending on the motor drive mode in order to improve efficiency of the system while covering both a low output operating point region and a high output operating point region.

In one embodiment of the present disclosure, the hybrid electric vehicle is proposed that, in the event of the HEV mode, the requested torque is distributed to each of the plurality of motors 120 and 140 based on the motor drive mode, and thereby the electric energy efficiency can be improved. A structure for this proposal is illustrated in FIG. 3.

Figure 3:
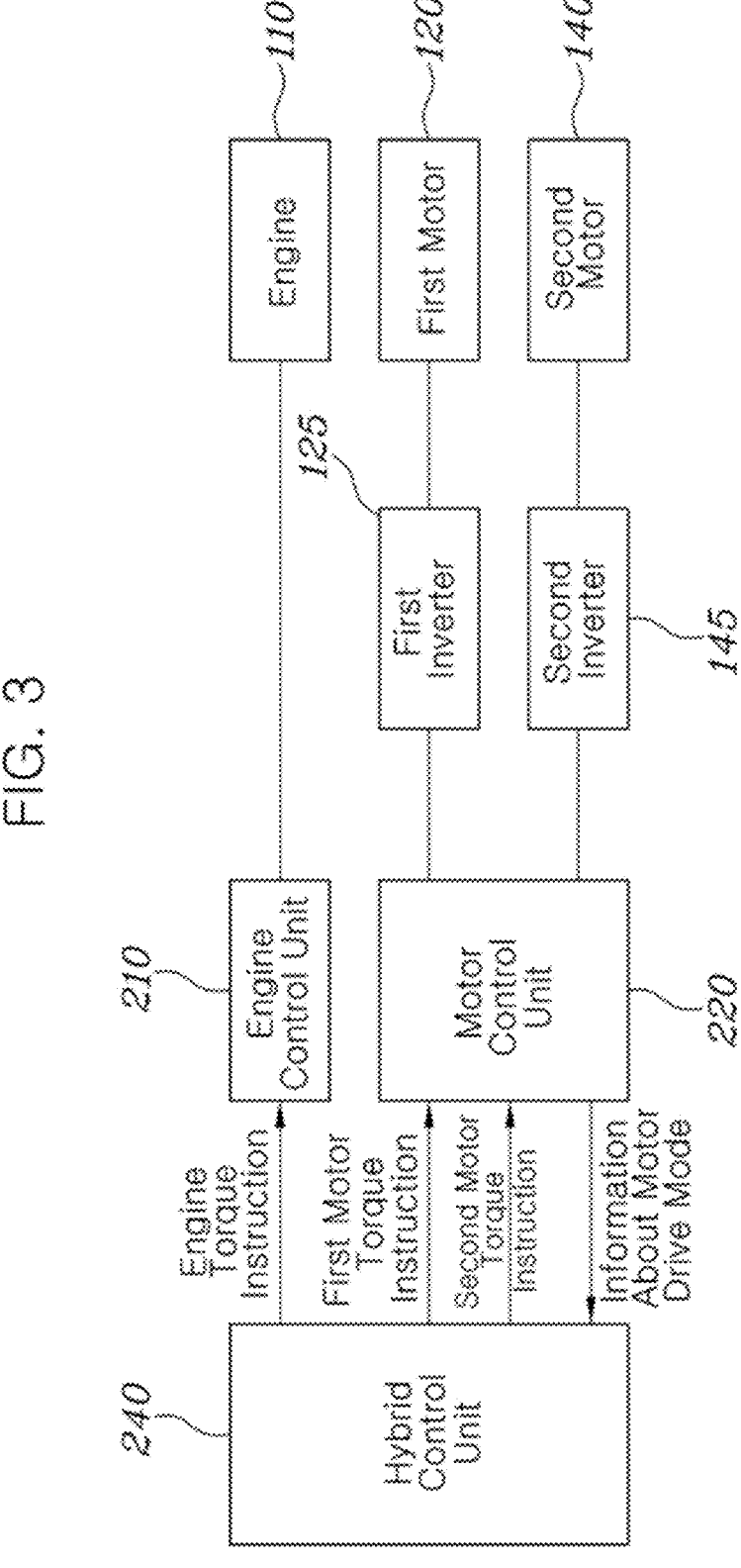
FIG. 3 illustrates an example of a control system configuration for driving a motor for the HEV according to an embodiment of the present disclosure.

FIG. 3 illustrates an example of a control system configuration for driving a motor for the HEV according to an embodiment of the present disclosure.

Referring to FIG. 3, in a hybrid electric vehicle in which embodiments of the present disclosure may be utilized, the HCU 240 may determine an operating point of each of the engine 110, the first motor 120, and the second motor 140, and may transmit a torque command according to the determined operating point to each of the engine control unit 210 and the MCU 220. The engine control unit 210 may control driving of the engine 110 based on the engine torque command. The MCU 220 may control driving of the first motor 120 through a first inverter 125 based on a first motor torque command, and may control driving of the second motor 140 through a second inverter 145 based on a second motor torque command. In the present embodiment, the plurality of inverters 125 and 145 may drive the plurality of motors 120 and 140, respectively. Alternatively, depending on an embodiment, one inverter may drive the plurality of motors 120 and 140.

The HCU 240 may determine the driving mode to be any one of the EV mode and the HEV mode based on, for instance, a value of an accelerator pedal sensor (APS), and may calculate torque request.

The EV mode may be a mode in which the second motor 140, directly connected with the input end of the transmission 150, and the first motor 120, directly connected with the engine 110, are separated through opening of the engine clutch 130, and the vehicle is driven using only the second motor 140. The HEV mode may be a mode in which the second motor 140, directly connected with the input end of the transmission 150, and the first motor 120, directly connected with the engine 110, are connected through engagement of the engine clutch 130, and the vehicle is driven using the engine 110, the first motor 120, and the second motor 140. In the relevant technical field, the HEV mode is often divided into an HEV-series mode and an HEV-Parallel mode. In one embodiment of the present disclosure, the HEV mode refers to the HEV-parallel mode.

When the HCU 240 determine the driving mode to be the EV mode, the HCU 240 enables the torque request to be satisfied through the second motor 140.

On the other hand, when, the HCU 240 determine the driving mode to be the HEV mode, the HCU 240 first distributes the requested torque to the engine 110, and may distribute the remaining requested torque (i.e., a difference between the requested torque and the torque distributed to the engine 110) to each of the first motor 120 and the second motor 140 as a sum torque of the first motor 120 and the second motor 140.

More specifically, in an embodiment, in the HEV mode, the HCU 240 performs a comparison between efficiency of the first motor 120 and efficiency of the second motor 140 based on an efficiency map of the first motor 120 and an efficiency map of the second motor 140. Thereby, the sum torque of the first motor 120 and the second motor 140 may be distributed to each of the first motor 120 and the second motor 140 to maximize efficiency of the system.

Accordingly, the MCU 220 may control driving of the first motor 120 through the first inverter 125 based on the torque distributed to the first motor 120, and may control driving of the second motor 140 through the second inverter 145 based on the torque distributed to the second motor 140.

In this case, the MCU 220 controls the driving of the first motor 120 through the first inverter 125 in a single drive mode. On the other hand, the MCU 220 may determine a motor drive mode according to an operating point of the second motor 140 for the purpose of high efficiency drive, and may control the driving of the second motor 140 through the second inverter 145 according to the determined motor drive mode.

That is, the efficiency map of the first motor 120 is one to which a single drive mode is applied, and the efficiency map of the second motor 140 should take into consideration of the motor drive mode determined by the MCU 220.

Prior to describing the efficiency map of the second motor 140 for which the motor drive mode is considered, the efficiency map of the first motor 120 will be described with reference to FIG. 4.

Figure 4:
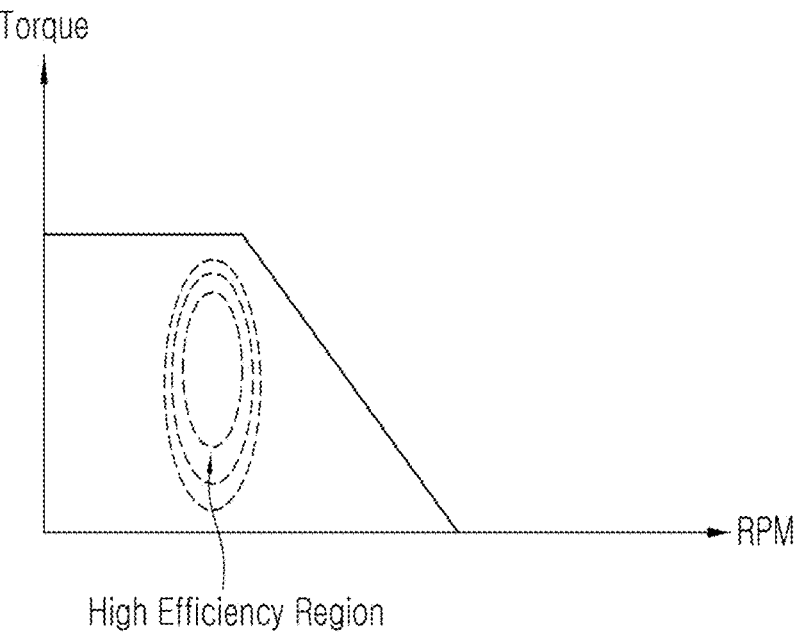
FIG. 4 illustrates an example of an efficiency map of a first motor illustrated in FIG. 3 according to an embodiment of the present disclosure.

FIG. 4 illustrates an example of an efficiency map of the first motor 120 illustrated in FIG. 3, according to an embodiment of the present disclosure.

Referring to FIG. 4, in the example efficiency map of the first motor 120, an operating point of the first motor 120 is determined by the torque and RPM of the first motor 120. A boundary on the coordinate system indicates a maximum torque of the first motor 120 according to the RPM. Each of isolines on the coordinate system indicates a set of operating points of the first motor 120, in which the operating points have the same efficiency. When the operating point of the first motor 120 is on an isoline matching a high efficiency region, the first motor 120 may be driven at a high efficiency. Since a single drive mode is applied to the first motor 120, it may be appreciated that there is also a single efficiency map for the first motor 120.

The motor drive mode used in the second motor 140 will now be described with reference to FIG. 5 in order to describe the efficiency map of the second motor 140 in which the motor drive mode is considered.

Figure 5:
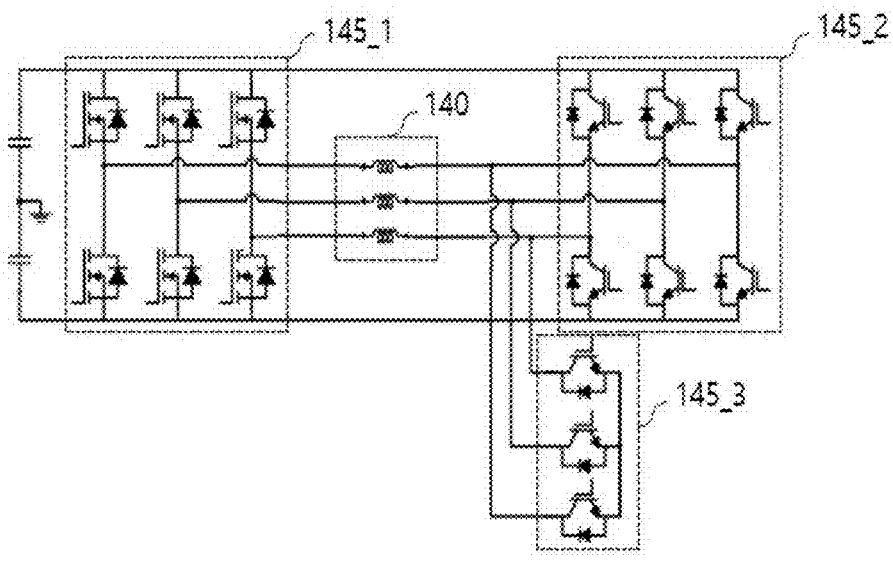
FIG. 5 illustrates an example of a circuit diagram of an inverter for driving a second motor illustrated in FIG. 3 according to an embodiment of the present disclosure.

FIG. 5 illustrates an example of a circuit diagram of the second inverter 145 for driving the second motor 140 illustrated in FIG. 3, according to an embodiment of the present disclosure.

Referring to FIG. 5, the second inverter 145 according to an embodiment of the present disclosure includes two three-phase inverters 145_1 and 145_2 and a transfer switch 145_3. The second inverter 145 may support a closed end winding (CEW) mode and an open end winding (OEW) mode depending on selective driving of the two three-phase inverters 145_1 and 145_2 and the transfer switch 145_3.

The CEW mode may be set by the MCU 220 for high efficiency driving of the second motor 140 in a low power operating point area. The OEW mode may be set by the MCU 220 for high efficiency driving of the second motor 140 in a high power operating point area.

When the motor drive mode is set as the CEW mode by the MCU 220, the second inverter 145 may provide AC current matching each of a plurality of phases to one end of each of a plurality of coils of the second motor 140 through one three-phase inverter 145_1 of the two three-phase inverters 145_1 and 145_2, and may control the other ends of the plurality of coils of the second motor 140 to be short-circuited through the transfer switch 145_3.

On the other hand, when the motor drive mode is set as the OEW mode by the MCU 220, the second inverter 145 may provide AC current matching each of the plurality of phases to both ends of each of the plurality of coils of the second motor 140 through the two three-phase inverters 145_1 and 145_2.

The efficiency map according to the motor drive mode applied to the second motor 140, according to embodiments, will be described with reference to FIGS. 6 and 7.

Figure 6:
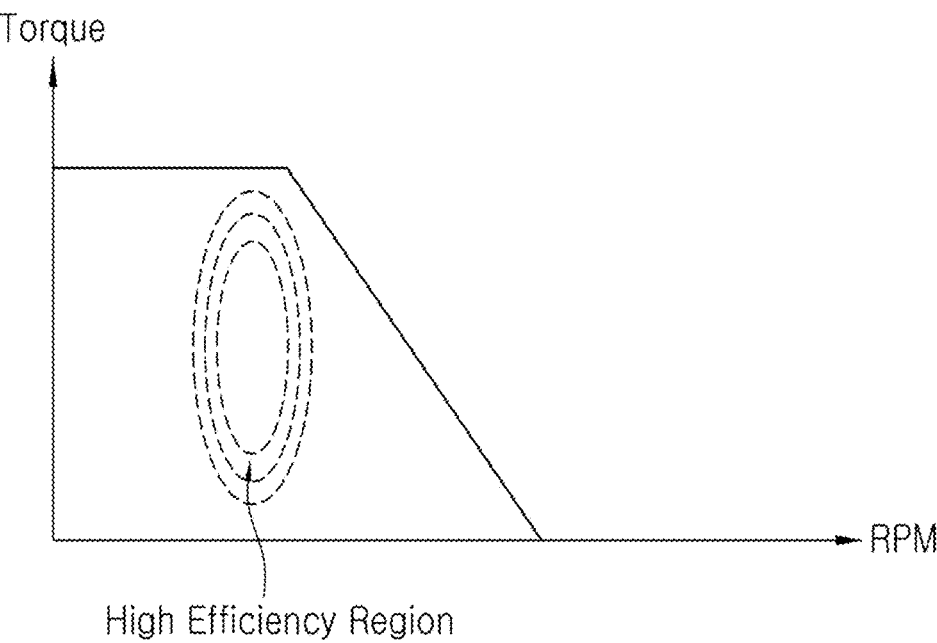
FIG. 6 illustrates an example of an efficiency map of a second motor to which a closed end winding mode is applied according to an embodiment of the present disclosure.

FIG. 6 illustrates an example of an efficiency map of second motor 140 to which a CEW mode is applied. FIG. 7 illustrates an example of an efficiency map of second motor 140 to which an OEW mode is applied.

Figure 7:
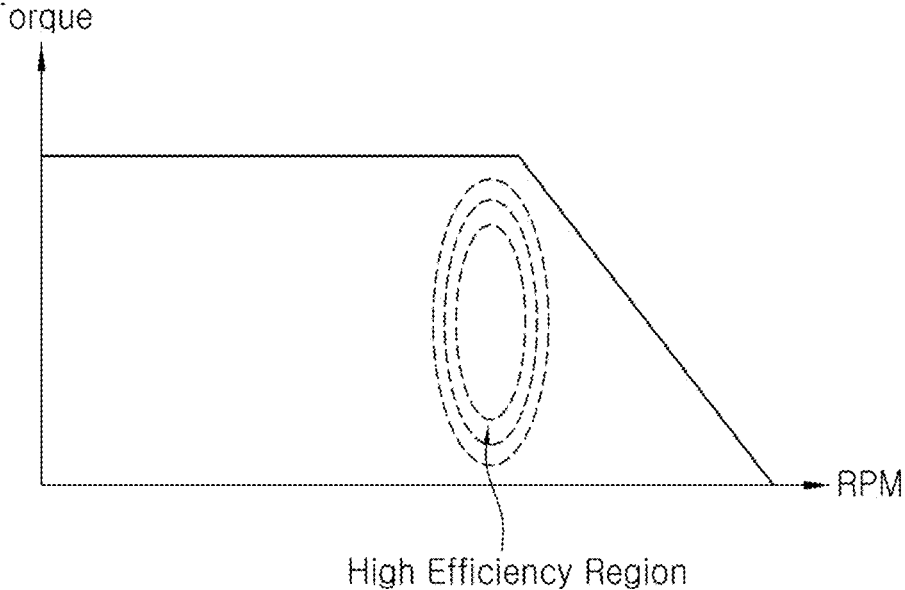
FIG. 7 illustrates an example of an efficiency map of a second motor to which an open end winding mode is applied according to an embodiment of the present disclosure.

Referring to FIGS. 6 and 7, it may be appreciated that the CEW mode has a high efficiency region at a low power operating point compared to the OEW mode, and the OEW mode has a high efficiency region at a high power operating point compared to the CEW mode. Thus, since the driving of the second motor 140 will be controlled at a low power operating point when the vehicle starts to travel, the MCU 220 will set the motor drive mode as the CEW mode. When high power is required during the travel, the motor drive mode will be set as the OEW mode.

Meanwhile, when the HCU 240 distributes a sum torque of the motors in the HEV mode, the second motor 140 may have different efficiencies for the same operating point depending on the motor drive mode set by the MCU 220. Thus, it is necessary for the HCU 240 to refer to a synthetic efficiency map in which efficiency maps according to the motor drive mode are synthesized.

Hereinafter, a synthetic efficiency map which the HCU 240 according to an embodiment of the present disclosure refers to according to the motor drive mode applied to the second motor 140 will be described with reference to FIGS. 8 and 9.

Figure 8:
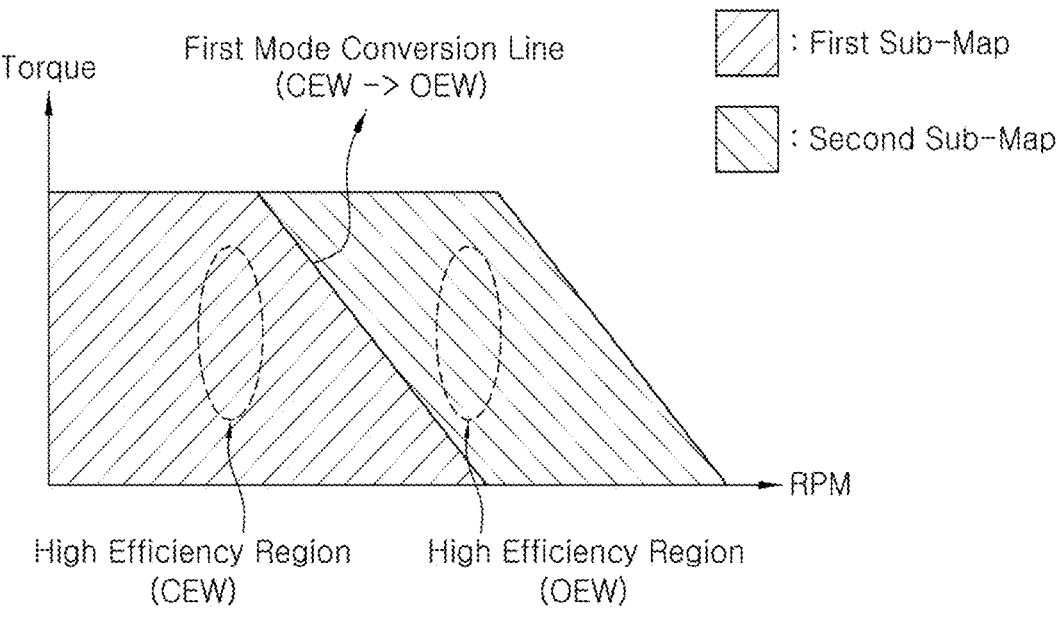
FIG. 8 illustrates an example of a first synthetic efficiency map according to an embodiment of the present disclosure.

FIG. 8 illustrates an example of a first synthetic efficiency map which the HCU 240 refers to when the motor drive mode is set as the CEW mode.

The first synthetic efficiency map may include a first sub-map and a second sub-map separated by a first mode conversion line that is a set of operating points to be switched from the CEW mode to the OEW mode by the MCU 220. The first sub-map represents the efficiency of the second motor 140 when the CEW mode is applied. The second sub-map represents the efficiency of the second motor 140 when the OEW mode is applied. Here, the first mode conversion line may be set according to characteristics of the second motor 140 and a power electronics (PE) system related to the driving of the second motor 140. The range of operating points of the second motor 140 matching the first sub-map may be set wider than the range of operating points of the second motor 140 matching the second sub-map.

In the first synthetic efficiency map, the first sub-map may include the high efficiency region of the CEW mode, and the second sub-map may include the high efficiency region of the OEW mode. Thus, the HCU 240 may refer to the efficiency of the second motor 140 to which the CEW mode is applied in the low power operating point area and the efficiency of the second motor 140 to which the OEW mode is applied in the high power operating point area, with respect to the first mode conversion reference line, thereby recognizing high efficiency regions of the second motor 140 according to the motor drive mode.

Meanwhile, when the MCU 220 also uses the first mode conversion line for switching from the OEW mode to the CEW mode, there is a problem in that the mode is frequently switched when the operating point frequently changes around the first mode conversion line.

In an embodiment, in order to overcome the above problem, the MCU 220 uses different mode conversion lines depending on the motor drive mode currently applied to the second motor 140 through a hysteresis region. Consequently, it is necessary for the HCU 240 to differently refer to the synthetic efficiency map based on the motor drive mode currently applied to the second motor 140.

Figure 9:
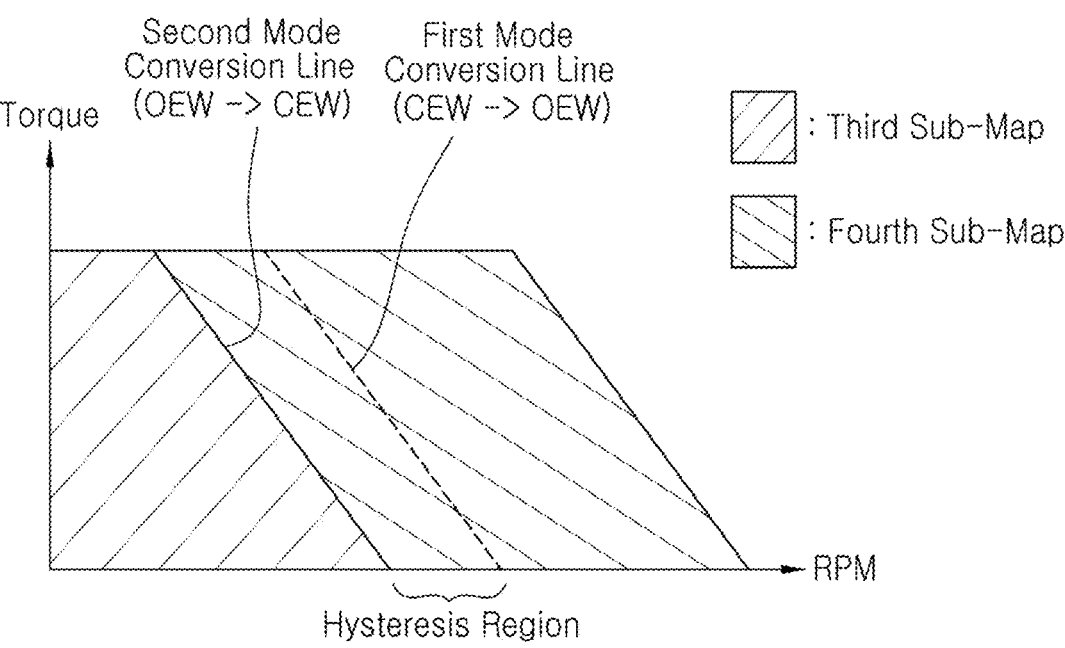
FIG. 9 illustrates an example of a second synthetic efficiency map according to an embodiment of the present disclosure.

FIG. 9 illustrates an example of a second synthetic efficiency map which the HCU 240 refers to when the motor drive mode is set as the OEW mode.

Referring to FIG. 9, the second synthetic efficiency map may include a third sub-map and a fourth sub-map separated by a second mode conversion line that is a set of operating points to be switched from the OEW mode to the CEW mode by the MCU 220. The third sub-map represents the efficiency of the second motor 140 to which the CEW mode is applied. The fourth sub-map represents the efficiency of the second motor 140 to which the OEW mode is applied. Here, the range of operating points of the second motor 140 matching the third sub-map may be set narrower than the range of operating points of the second motor 140 matching the fourth sub-map.

The second mode conversion line is a set of operating points produced by reflecting a hysteresis region to the first mode conversion line illustrated in FIG. 8. Consequently, when the motor drive mode is set as the OEW mode, the HCU 240 may recognize the efficiency of the second motor 140 depending on the motor drive mode currently applied to the second motor 140 by referring to the efficiency of the second motor 140 based on the second mode conversion line to which the hysteresis region is reflected.

Figure 10:
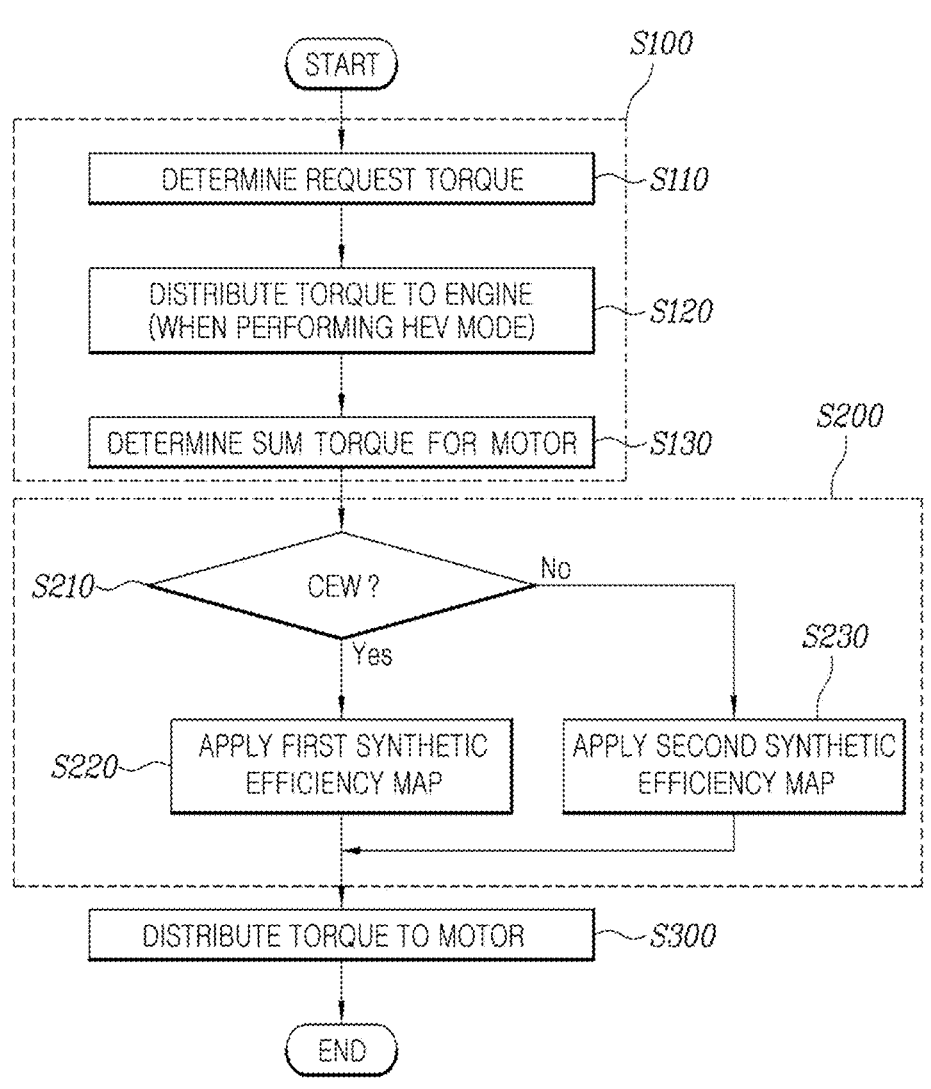
FIG. 10 is a flow chart of a method of controlling motor driving of a hybrid electric vehicle according to an embodiment of the present disclosure.

FIG. 10 is a flow chart illustrating a method of controlling motor driving of a hybrid electric vehicle according to an embodiment of the present disclosure.

Referring to FIG. 10, the method of controlling motor driving of a hybrid electric vehicle may include a step S100 of determining a sum torque of the motors (i.e., of the first motor 120 and the second motor 140), a step S200 of selectively applying a synthetic efficiency map to an efficiency map of the second motor 140 based on information about the motor drive mode, and a step S300 of distributing the sum torque of the motors.

The step S100 of determining the sum torque of motors may determine the sum torque of the first motor 120 directly connected to the engine 110 and the second motor 140 directly connected to the input end of the transmission 150, based on torque required by the HCU 240 and torque distributed to the engine 110.

More specifically, the step S100 of determining the sum torque of motors may include a step S110 of determining requested torque, a step S120 of distributing the requested torque to the engine 110, and a step S130 of determining remaining requested torque (i.e., a difference between the requested torque and the torque distributed to the engine 110) to be the sum torque of the motors. The step S120 of distributing the requested torque to the engine 110 may be performed so that the HCU 240 first distributes the requested torque to the engine 110 when the driving mode is the HEV mode.

In the step S200 of selectively applying the synthetic efficiency map, the HCU 240 may selectively apply one of the first synthetic efficiency map and the second synthetic efficiency map, in which different conversion references of the motor drive mode are set, to the efficiency map of the second motor 140, based on information about the motor drive mode applied to the second motor 140. Here, setting different conversion references of the motor drive mode means that the first mode conversion line and the second mode conversion line described above with reference to FIGS. 8 and 9 are different.

More specifically, the step S200 of selectively applying the synthetic efficiency map may include a step S210 of determining the motor drive mode applied to the second motor 140, a step S220 of applying the first synthetic efficiency map to the efficiency map of the second motor 140 when the motor drive mode is determined to be the CEW mode, and a step S230 of applying the second synthetic efficiency map to the efficiency map of the second motor 140 when the motor drive mode is determined to be the OEW mode.

Here, the step S210 of determining the motor drive mode applied to the second motor 140 may include a step of detecting, by the MCU 220, a driving method of the second inverter 145 that drives the second motor 140, a step of outputting, by the MCU 220, the detected driving method of the second inverter 145 as information about the motor drive mode to the HCU 240, and a step of determining, by the HCU 240, the motor drive mode currently applied to the second motor 140 based on the output information about the motor drive mode.

In the step S300 of distributing the sum torque of the motors, the HCU 240 may distribute the sum torque of the first motor 120 and the second motor 140 to the first motor 120 and the second motor 140 to maximize the system efficiency. In an embodiment, the HCU 240 may distribute the sum torque of the first motor 120 and the second motor 140 to the first motor 120 and the second motor 140 by comparing the efficiency of the first motor 120 and the efficiency of the second motor 140, and distributing the sum torque of the first motor 120 and the second motor 140 to the first motor 120 and the second motor 140 based on the efficiency map of the first motor 120 and the efficiency map of the second motor 140.

As described above, the hybrid electric vehicle according to the present embodiment can improve electric energy efficiency by selectively applying the efficiency map of the second motor 140, the driving of which is controlled depending on the motor drive mode, and distributing the requested torque to each of the motors 120 and 140 based on the applied efficiency map.

Although the foregoing embodiments have been described as being intended to select the operating point of the second motor 140 in the HEV mode of a hybrid electric vehicle, the present disclosure is not limited thereto. The present disclosure may be applied to any type of electrified vehicle provided with two or more motors, each of which delivers power to a corresponding drive wheel, as long as one motor of the two or more motors supports switching between the OEW mode and the CEW mode. For example, in the case of an electric vehicle provided with two motors, the distribution of the requested torque to the engine may be omitted, and the requested torque may be distributed to the two motors. In the determination of the operating point of the motor supporting switching between motor drive modes, the efficiency map may be applied in a different manner depending on the currently-applied motor drive mode.

The present disclosure set forth above may be embodied as computer readable codes in a medium in which a program is recorded. The computer readable medium includes any type of recording device in which data readable by a computer system is stored. Examples of the computer readable medium includes hard disk drives (HDDs), solid state disks (SSDs), silicon disk drives (SDDs), ROMs, RAMs, CD-ROMs, magnetic tape, floppy disks, optical data storages, and the like. The above embodiments are therefore to be construed in all aspects as illustrative and not restrictive. The scope of the disclosure should be determined by the appended claims and their legal equivalents and all changes coming within the meaning and equivalency range of the appended claims are intended to be embraced therein.

What is claimed is:

1. A method of controlling motor driving of a hybrid electric vehicle, the method comprising:

determining a sum torque of a first motor, which is directly connected to an engine, and a second motor, which is directly connected to an input end of a transmission, based on a requested torque and a torque distributed to the engine;

selectively applying one of a first synthetic efficiency map and a second synthetic efficiency map, to which different conversion references of a motor drive mode are set, to an efficiency map of the second motor, based on information about the motor drive mode applied to the second motor; and distributing the sum torque to each of the first motor and the second motor based on an efficiency map of the first motor and the efficiency map of the second motor, wherein the second motor is driven by a first inverter connected to first ends of windings of the second motor, a second inverter connected to second ends of the windings of the second motor, and a plurality of transfer switches having i) first ends connected between the second ends of the windings of the second motor and the second inverter and ii) second ends directly connected to each other, and wherein the motor drive mode includes:

a closed end winding mode in which alternating currents corresponding to a plurality of phases are provided to the first ends of the windings of the second motor by controlling the first inverter, and the second ends of the windings of the second motor are short circuited by controlling the first inverter and the plurality of transfer switches, and an open end winding mode in which the plurality of transfer switches are controlled to be opened, and the alternating currents corresponding to the plurality of phases are provided to the first and second ends of the windings of the second motor by controlling the first inverter and the second inverter.

2. The method according to claim 1, wherein determining the sum torque includes:

determining the requested torque;

distributing the requested torque to the engine; and determining a difference between the requested torque and the torque distributed to the engine to be the sum torque.

3. The method according to claim 2, wherein distributing the requested torque to the engine includes distributing the requested torque to the engine when a driving mode is a HEV mode, wherein the HEV mode is a mode that controls the second motor and the first motor to be connected through fastening of an engine clutch, and that drives the hybrid electric vehicle through the first motor and the second motor.

4. The method according to claim 1, wherein selectively applying one of the first synthetic efficiency map and the second synthetic efficiency map includes:

determining the motor drive mode applied to the second motor;

applying, when the motor drive mode is determined to be the closed end winding mode, the first synthetic efficiency map to the efficiency map of the second motor; and applying, when the motor drive mode is determined to be the open end winding mode, the second synthetic efficiency map to the efficiency map of the second motor.

5. The method according to claim 4, wherein determining the motor drive mode includes:

sensing a drive mode of the first inverter and the second inverter driving the second motor at a first control unit;

outputting the sensed drive mode of the first inverter and the second inverter to a second control unit as information about the motor drive mode at the first control unit; and determining the motor drive mode based on the output information at the second control unit.

6. The method according to claim 4, wherein the first synthetic efficiency map includes, based on a first mode conversion line that is a set of operating points at which the motor drive mode is switched from the closed end winding mode into the open end winding mode:

a first sub-map that indicates efficiency of the second motor to which the closed end winding mode is applied, and a second sub-map that indicates efficiency of the second motor which is driven in the open end winding mode.

7. The method according to claim 6, wherein a range of the operating points of the second motor which corresponds to the first sub-map is set to be wider than a range of the operating points of the second motor which corresponds to the second sub-map.

8. The method according to claim 4, wherein the second synthetic efficiency map includes, based on a second mode conversion line that is a set of operating points at which the motor drive mode is switched from the open end winding mode into the closed end winding mode:

a third sub-map that indicates efficiency of the second motor to which the closed end winding mode is applied, and a fourth sub-map that indicates efficiency of the second motor to which the open end winding mode is applied.

9. The method according to claim 8, wherein a range of the operating points of the second motor which corresponds to the third sub-map is set to be narrower than a range of the operating points of the second motor which corresponds to the fourth sub-map.

10. A hybrid electric vehicle, comprising:

an engine;

a first motor directly connected to the engine;

a second motor configured to be selectively connected with the first motor based on a driving mode;

a transmission having an input end directly connected to the second motor;

a first control unit configured to: determine a sum torque of the first motor and the second motor based on a requested torque and torque distributed to the engine, and distribute the sum torque to each of the first motor and the second motor based on an efficiency map of the first motor and an efficiency map of the second motor;

a second control unit configured to: control driving of the first motor based on the torque distributed to the first motor, determine a motor drive mode based on torque distributed to the second motor, and control driving of the second motor based on the determined motor drive mode;

a first inverter connected to first ends of windings of the second motor;

a second inverter connected to second ends of the windings of the second motor; and a plurality of transfer switches having i) first ends connected between the second ends of the windings of the second motor and the second inverter and ii) second ends directly connected to each other, wherein the first control unit is configured to selectively apply one of a first synthetic efficiency map and a second synthetic efficiency map, to which a conversion reference of the motor drive mode is differently set, to the efficiency map of the second motor, based on information about the motor drive mode received from the second control unit, and wherein the second control unit is configured to:

when the motor drive mode is set to a closed end winding mode, control the first inverter to provide alternating current corresponding to each of a plurality of phases to the first ends of the windings of the second motor, and control the second inverter and the plurality of transfer switches to control second ends of the windings of the second motor to be short-circuited, and when the motor drive mode is set to an open end winding mode, control the plurality of transfer switches to be opened, and control the first inverter and the second inverter to provide alternating current corresponding to each of the plurality of phases to the first and second ends of the windings of the second motor.

11. The hybrid electric vehicle according to claim 10, wherein:

the first motor and the second motor are connected through fastening of an engine clutch when the drive mode is a hybrid electric vehicle (HEV) mode; and the HEV mode is a mode of controlling the second motor and the first motor to be connected through fastening of the engine clutch, and of driving the hybrid electric vehicle through the engine, the first motor, and the second motor.

12. The hybrid electric vehicle according to claim 11, wherein the first control unit is configured to: distribute the requested torque to the engine when the driving mode is the HEV mode, and determine a difference between the requested torque and the torque distributed to the engine as the sum torque.

13. The hybrid electric vehicle according to claim 10, wherein the first control unit is configured to:

when the motor drive mode is the closed end winding mode, apply the first synthetic efficiency map to the efficiency map of the second motor; and when the motor drive mode is the open end winding mode, apply the second synthetic efficiency map to the efficiency map of the second motor.

14. The hybrid electric vehicle according to claim 13, wherein the first synthetic efficiency map includes, based on a first mode conversion line that is a set of operating points at which the motor drive mode is switched from the closed end winding mode into the open end winding mode:

a first sub-map that indicates efficiency of the second motor to which the closed end winding mode is applied; and a second sub-map that indicates efficiency of the second motor that is driven on the open end winding mode.

15. The hybrid electric vehicle according to claim 13, wherein the second synthetic efficiency map includes, based on a second mode conversion line that is a set of operating points at which the motor drive mode is switched from the open end winding mode into the closed end winding mode:

a third sub-map that indicates efficiency of the second motor to which the closed end winding mode is applied; and a fourth sub-map that indicates efficiency of the second motor to which the open end winding mode is applied.

16. A method of controlling motor driving of an electrified vehicle, the method comprising:

determining a sum torque of a first motor and a second motor;

selectively applying one of a first synthetic efficiency map and a second synthetic efficiency map, to which a conversion reference of a motor drive mode is differently set, to an efficiency map of the second motor, based on information about the motor drive mode applied to the second motor; and distributing the sum torque to each of the first motor and the second motor based on an efficiency map of the first motor and the efficiency map of the second motor, wherein the second motor is driven by a first inverter connected to first ends of windings of the second motor, a second inverter connected to second ends of the windings of the second motor, and a plurality of transfer switches having i) first ends connected between the second ends of the windings of the second motor and the second inverter and ii) second ends directly connected to each other, and wherein the motor drive mode includes:

a closed end winding mode in which alternating currents corresponding to a plurality of phases are provided to the first ends of the windings of the second motor by controlling the first inverter, and the second ends of the windings of the second motor are short circuited by controlling the first inverter and the plurality of transfer switches, and an open end winding mode in which the plurality of transfer switches are controlled to be opened, and the alternating currents corresponding to the plurality of phases are provided to the first and second ends of the windings of the second motor by controlling the first inverter and the second inverter.

* * * * *